United States Patent
Watanabe et al.

(10) Patent No.: US 10,000,383 B2
(45) Date of Patent: Jun. 19, 2018

(54) $CO_2$ RECOVERY APPARATUS AND $CO_2$ RECOVERY METHOD (71) Applicant: THE KANSAI ELECTRIC POWER CO., INC., Osaka-shi (JP)

(72) Inventors: Tsunenori Watanabe, Amagasaki (JP); Tetsuo Sasaki, Amagasaki (JP); Michio Hirose, Amagasaki (JP); Yasuyuki Yagi, Amagasaki (JP); Hiroshi Deguchi, Amagasaki (JP)

(73) Assignee: THE KANSAI ELECTRIC POWER CO., INC. (JP)

(*) Notice: Subject to any disclaimer, the term of this patent is extended or adjusted under 35 U.S.C. 154(b) by 152 days.

(21) Appl. No.: 14/892,619

(22) PCT Filed: Mar. 19, 2014

(86) PCT No.: PCT/JP2014/057557
§ 371 (c)(1),
(2) Date: Nov. 20, 2015

(87) PCT Pub. No.: WO2014/192381
PCT Pub. Date: Dec. 4, 2014

(65) Prior Publication Data
US 2016/0115034 A1 Apr. 28, 2016

(30) Foreign Application Priority Data
May 28, 2013 (JP) .................. 2013-111842

(51) Int. Cl.
*B01D 53/14* (2006.01)
*C01B 31/20* (2006.01)
(Continued)

(52) U.S. Cl.
CPC .......... *C01B 31/20* (2013.01); *B01D 53/1425* (2013.01); *B01D 53/1475* (2013.01);
(Continued)

(58) Field of Classification Search
CPC ........... B01D 2252/20431; B01D 2252/20478; B01D 2252/20484; B01D 2252/20489;
(Continued)

(56) References Cited

U.S. PATENT DOCUMENTS 5,378,442 A    1/1995   Fujii et al.
7,601,315 B2 * 10/2009   Ouimet .............. B01D 53/1475
                                                   423/228
(Continued)

FOREIGN PATENT DOCUMENTS

| CN | 105749728 A | | 7/2016 | |
|---|---|---|---|---|
| JP | H05184865 A | | 7/1993 | |
| JP | 08-173748 | * | 7/1996 | ............ Y02P 20/152 |
| JP | 2011057485 A | | 3/2011 | |
| JP | 2013013877 A | | 1/2013 | |
| WO | WO2004/076031 A1 | | 9/2004 | |
| WO | WO2012119715 A1 | | 9/2012 | |
| WO | WO2013/080889 | * | 6/2013 | ............ B01J 27/24 |

OTHER PUBLICATIONS

European Extended Search Report dated Jan. 3, 2017; EP Application No. 14805091.7; 9 pgs.
(Continued)

*Primary Examiner* — Cabrena Holecek
(74) *Attorney, Agent, or Firm* — Schmeiser, Olsen & Watts, LLP (57) ABSTRACT

A $CO_2$ recovery apparatus capable of recovering $CO_2$ by using only a low-quality exhaust heat at 100° C. or less is provided. The present invention includes an absorption tower for allowing a basic aqueous solution to absorb $CO_2$; and a regenerator for heating a basic aqueous solution with $CO_2$ absorbed therein using a heating medium having a temperature of 100° C. or less, thereby desorbing $CO_2$.

7 Claims, 3 Drawing Sheets

(51) Int. Cl.
*B01D 53/62* (2006.01)
*B01D 53/96* (2006.01)
*C01B 32/50* (2017.01)

(52) U.S. Cl.
CPC .............. *B01D 53/62* (2013.01); *B01D 53/96* (2013.01); *C01B 32/50* (2017.08); *B01D 2252/20431* (2013.01); *B01D 2252/20478* (2013.01); *B01D 2252/20484* (2013.01); *B01D 2252/20489* (2013.01); *B01D 2255/20738* (2013.01); *B01D 2255/20761* (2013.01); *B01D 2255/40* (2013.01); *B01D 2255/50* (2013.01); *B01D 2255/70* (2013.01); *B01D 2257/504* (2013.01); *Y02C 10/04* (2013.01); *Y02C 10/06* (2013.01); *Y02P 20/152* (2015.11)

(58) Field of Classification Search
CPC ........... B01D 2255/20738; B01D 2255/20761; B01D 2255/40; B01D 2255/50; B01D 2255/70; B01D 2257/504; B01D 53/1425; B01D 53/1475; B01D 53/1493; B01D 53/62; B01D 53/96; C01B 31/20; C01B 32/50; Y02C 10/04; Y02C 10/06; Y02P 20/152

See application file for complete search history.

(56) References Cited

U.S. PATENT DOCUMENTS

| 2007/0163443 | A1 | 7/2007 | Moriyama |
| 2009/0238731 | A1 | 9/2009 | Liu et al. |
| 2009/0238742 | A1 | 9/2009 | Liu et al. |
| 2012/0161071 | A1 | 6/2012 | Murai |
| 2012/0282160 | A1 | 11/2012 | Just |
| 2013/0008310 | A1 | 1/2013 | Aroonwilas |
| 2013/0108532 | A1 | 5/2013 | Idem |
| 2014/0284521 | A1* | 9/2014 | Deguchi ............ B01D 53/1425 252/190 |
| 2016/0030880 | A1 | 2/2016 | Wong et al. |

OTHER PUBLICATIONS

International Search Report; PCT/JP2014/057557; International Filing Date: Mar. 19, 2014; 2 Pgs.

* cited by examiner

$CO_2$ RECOVERY APPARATUS AND $CO_2$ RECOVERY METHOD

CROSS-REFERENCE TO RELATED APPLICATIONS

This application claims priority to PCT Application No. PCT/JP2014/057557, having a filing date of Mar. 19, 2014, based on JP2013-111842 having a filing date of May 28, 2013, the entire contents of which are hereby incorporated by reference.

FIELD OF TECHNOLOGY

The following relates to a $CO_2$ recovery apparatus and a $CO_2$ recovery method for recovering $CO_2$ absorbed in an amine solution.

BACKGROUND

A chemical absorption method is known as a method for removing and recovering $CO_2$ from combustion exhaust gas from thermal power stations and steel works. A known apparatus for recovering $CO_2$ using a chemical absorption method generally has an absorption tower and a regeneration tower. In the absorption tower, $CO_2$ is absorbed into an amine compound aqueous solution (hereinafter referred to as an amine solution) at 40° C. to 50° C. The amine solution with $CO_2$ absorbed therein (hereinafter referred to as a rich solution) is supplied to the regeneration tower. The regeneration tower is modeled after a general distillation tower, and is structured such that a rich solution supplied dropwise into the regeneration tower comes in countercurrent contact with ascending vapor, thus heating the rich solution. As a result, $CO_2$ is desorbed from the rich solution (since the gas obtained by the desorption includes saturated vapor, the gas is hereinafter referred to as vapor-containing $CO_2$). The amine solution resulting from the $CO_2$ desorption from the rich solution is heated by externally introduced high-temperature steam in the regeneration tower or in a reboiler connected to the regeneration tower, thereby generating vapor from the amine solution. The generated vapor is introduced from a lower portion of the regeneration tower and heats the rich solution, as mentioned above. The vapor-containing $CO_2$ generated in the regeneration tower is cooled as it comes out through the top of the regeneration tower, thereby removing the moisture from the vapor-containing $CO_2$ to recover $CO_2$. The amine solution from which the $CO_2$ has been desorbed (hereinafter referred to as a lean solution) is cooled to 40° C. to 50° C., and is supplied to the absorption tower to be reused.

The $CO_2$ recovery by the above known apparatus is performed by heating an amine solution in a regeneration tower or in a reboiler connected to the regeneration tower using high-temperature steam of about 120° C., thereby generating vapor from the amine solution. As a result, the amine solution can be heated to a high temperature, and the amount of $CO_2$ recovered from the amine solution can be increased.

However, since the known apparatus consumes a great deal of energy so as to generate high-temperature steam of about 120° C., many energy reduction systems have been suggested to date. Examples of these systems include a system in which the temperature of the amine solution in the regeneration tower (regeneration temperature) is decreased to about 100° C.

The known apparatus system has a low-temperature regeneration tower that performs regeneration at a temperature of, for example, 100° C.; and a high-temperature regeneration tower that performs regeneration at a temperature of, for example, 120° C. In this system, the entire amount of energy used for $CO_2$ recovery is less than that used in the system having only a regeneration tower that performs regeneration at a temperature of 120° C. However, the system disclosed requires a 120° C. heat source to be used for the high-temperature regeneration tower.

Further, when an amine solution is heated by high-temperature steam as in the known system, the vapor-containing $CO_2$ separated from the amine solution and the amine solution from which $CO_2$ is separated have a high temperature. Therefore, the system causes a large loss in sensible heat and/or latent heat due to the cooling of the vapor-containing $CO_2$, as well as a large loss in sensible heat by the cooling of the amine solution.

SUMMARY

Technical Problem

As disclosed, the regeneration tower of the known $CO_2$ recovery apparatuses is modeled after a general distillation tower. The regeneration energy (recover energy) per unit of $CO_2$ can generally be reduced by increasing the $CO_2$ desorption amount (recovery amount) in the regeneration tower. In order to increase the $CO_2$ desorption, it has been considered desirable to generate high-temperature vapor by boiling the amine solution in the reboiler, and introduce the vapor from a lower portion of the regeneration tower so that the vapor comes in countercurrent contact with the amine solution supplied dropwise from an upper portion, thereby keeping the amine solution at a high temperature. Further, to accomplish such a mechanism, the temperature of the amine solution in the reboiler is adjusted to about 120° C. using a relatively high-quality heating medium having a temperature of about 120° C. (in many cases, steam). Such a system was developed based on an idea of using a regeneration tower modeled after a distillation tower. To date, the system development has not focused attention on reduction in reboiler temperature (regeneration temperature).

The following was made in view of the above circumstances, and an aspect relates to a $CO_2$ recovery apparatus and a $CO_2$ recovery method capable of recovering $CO_2$ using a relatively low-quality heat at 100° C. or less.

Solution to Problem

A CO2 recovery apparatus according to the first aspect of embodiments of the present invention comprises an absorption unit for allowing a basic aqueous solution to absorb $CO_2$; and a regeneration unit for heating a basic aqueous solution with $CO_2$ absorbed therein using a heating medium having a temperature of 100° C. or less, thereby desorbing vapor-containing $CO_2$.

The $CO_2$ recovery apparatus preferably further comprises a heat exchanger for performing heat exchange between the basic aqueous solution with $CO_2$ absorbed therein and a basic aqueous solution from which vapor-containing $CO_2$ is desorbed; a cooler for cooling the basic aqueous solution from which vapor-containing $CO_2$ is desorbed to 50° C. or less after the basic aqueous solution passes through the heat exchanger; and a cooling device for cooling the vapor-containing $CO_2$, thereby removing moisture from the vapor-containing $CO_2$.

The heating medium is preferably water.

The basic aqueous solution is preferably an alkanolamine aqueous solution.

The alkanolamine aqueous solution is preferably an aqueous solution containing, as a major component, a single kind or a combination of two or more kinds of tertiary amine solutions and/or amine solutions having a large steric hindrance.

The regeneration unit preferably performs heating using a regenerator having a multitubular heat exchanger structure and a heating medium having a temperature of 100° C. or less, thereby desorbing vapor-containing $CO_2$.

The regeneration unit preferably comprises a regenerator for storing a basic aqueous solution, a heat exchanger for heating a basic aqueous solution using a heating medium having a temperature of 100° C. or less, and a system for circulating a basic aqueous solution between the regenerator and the heat exchanger; and the system preferably supplies a basic aqueous solution from which $CO_2$ is desorbed in the regenerator and which is decreased in temperature to the heat exchanger, and supplies a basic aqueous solution to which heat is added by heating in the heat exchanger using a heating medium having a temperature of 100° C. or less to the regenerator.

A catalyst comprising an inorganic powder or inorganic powder compact is preferably provided either or both of a portion having the basic aqueous solution inside the regenerator and a basic aqueous solution flow path in the regeneration unit; and the inorganic powder or inorganic powder compact preferably has a BET specific surface area of 7 $m^2/g$ or more.

The catalyst comprising an inorganic powder or inorganic powder compact is preferably a zeolite catalyst or alumina catalyst, or a combination of two or more kinds of these catalysts.

A $CO_2$ recovery method according to the second aspect of embodiments of the present invention comprises an absorbing step of allowing a basic aqueous solution to absorb $CO_2$; and a regeneration step of heating a basic aqueous solution with $CO_2$ absorbed therein using a heating medium having a temperature of 100° C. or less, thereby desorbing vapor-containing $CO_2$.

The $CO_2$ recovery method preferably further comprises a heat exchange step of performing heat exchange between the basic aqueous solution with $CO_2$ absorbed therein and a basic aqueous solution from which vapor-containing $CO_2$ is desorbed; a cooling step for cooling the basic aqueous solution from which vapor-containing $CO_2$ is desorbed to 50° C. or less after the basic aqueous solution is subjected to the heat exchange in the heat exchange step; and a $CO_2$ desorption step for cooling the vapor-containing $CO_2$, thereby removing moisture from the vapor-containing $CO_2$.

The heating medium is preferably water.

The basic aqueous solution is preferably an alkanolamine aqueous solution.

The alkanolamine aqueous solution is preferably an aqueous solution containing, as a major component, a single kind or a combination of two or more kinds of tertiary amine solutions and/or amine solutions having a large steric hindrance.

The regeneration step is preferably performed such that a regenerator having a multitubular heat exchanger structure heats the basic aqueous solution with $CO_2$ absorbed therein using a heating medium having a temperature of 100° C. or less, thereby desorbing vapor-containing $CO_2$.

The regeneration step is preferably performed such that $CO_2$ is desorbed in a regenerator for storing a basic aqueous solution; heat is added to the basic aqueous solution decreased in temperature due to $CO_2$ desorption by heating in a heat exchanger using a heating medium having a temperature of 100° C. or less; and the basic aqueous solution to which heat is added is supplied again to the regenerator, thereby desorbing vapor-containing $CO_2$.

A catalyst comprising an inorganic powder or inorganic powder compact is preferably provided either or both of a portion having the basic aqueous solution inside the regenerator and a basic aqueous solution flow path in the regeneration unit; and the inorganic powder or inorganic powder compact preferably has a BET specific surface area of 7 $m^2/g$ or more.

The catalyst comprising an inorganic powder or inorganic powder compact is preferably a zeolite catalyst or alumina catalyst, or a combination of two or more kinds of these catalysts.

Advantageous Effects of Invention

In embodiments of the present invention, in the process of desorbing vapor-containing $CO_2$ from a basic aqueous solution in the regenerator, a heating medium having a temperature of 100° C. or less is used to supply heat to the basic aqueous solution. Examples of low-quality heat (low energy) such as a heat source at 100° C. or less include unused exhaust heat energy generated in thermal power stations, steel works, and other industries. Therefore, embodiments of the present invention enables $CO_2$ recovery using a low-quality heat.

Further, embodiments of the present invention performs heat exchange between the basic aqueous solution with the $CO_2$ absorbed therein and a liquid heating medium so as to desorb vapor-containing $CO_2$ from the basic aqueous solution, and then cools the vapor-containing $CO_2$, thereby recovering only $CO_2$ from the vapor. In this manner, it is possible to recover $CO_2$. Moreover, in embodiments of the present invention, the amounts of exhaust heats (1) and (2) below required during $CO_2$ recovery can be reduced.

(1) Amount of exhaust heat upon cooling of basic aqueous solution.

(2) Amount of exhaust heat upon cooling of vapor-containing $CO_2$.

More specifically, reduction in the amount of exhaust heat (1) is accomplished such that, since a heating medium having a temperature of 100° C. or less is used, the basic aqueous solution from which vapor-containing $CO_2$ has been desorbed has a temperature lower than that in the method using high-temperature steam. Therefore, it is possible to reduce the amount of exhaust heat required in the cooling step before the introduction of the basic aqueous solution from which vapor-containing $CO_2$ has been desorbed to the absorption tower.

The reduction in the amount of exhaust heat (2) is accomplished such that, since a heating medium having a temperature of 100° C. or less is used, the vapor-containing $CO_2$ desorbed from the basic aqueous solution has a temperature lower than that in the method using high-temperature steam. Therefore, it is not necessary to greatly decrease the temperature of the vapor-containing $CO_2$ to separate the $CO_2$ from the vapor-containing $CO_2$. Thus, it is possible to reduce the amount of exhaust heat upon cooling of the vapor-containing $CO_2$.

Accordingly, embodiments of the present invention enable reduction in the amount of exhaust heat during the $CO_2$ recovery, thereby reducing the thermal energy required for the $CO_2$ recovery.

BRIEF DESCRIPTION

Some of the embodiments will be described in detail, with reference to the following figures, wherein like designations denote like members, wherein.

DETAILED DESCRIPTION

Figure 1:
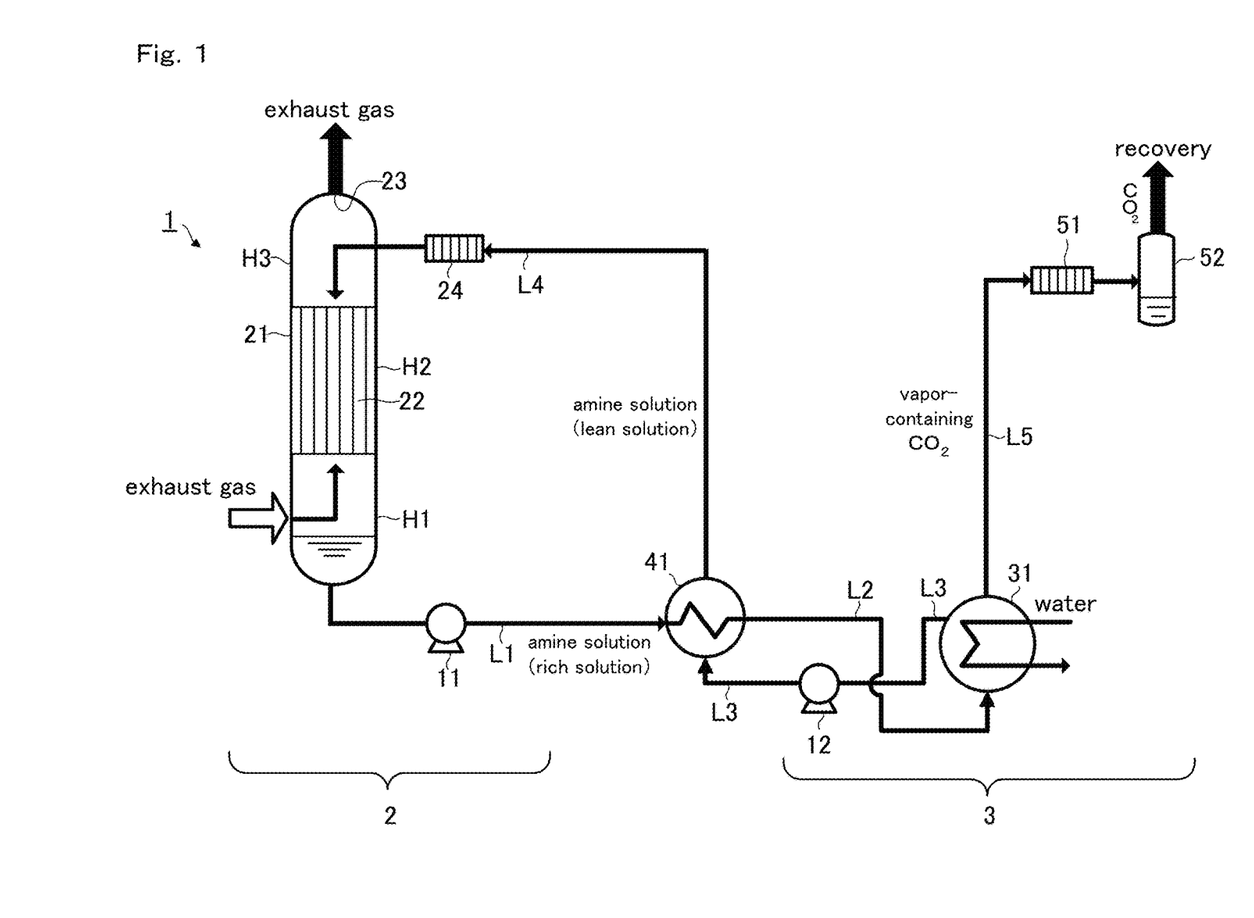
FIG. 1 is a diagram 1 schematically showing one embodiment of a $CO_2$ desorption apparatus according to the first embodiment of the present invention.

A $CO_2$ recovery apparatus and a $CO_2$ recovery method according to the first embodiment of the present invention are described below. FIG. 1 is a schematic diagram showing a $CO_2$ recovery apparatus 1 according to the first embodiment. The $CO_2$ recovery apparatus 1 according to the first embodiment removes and recovers $CO_2$ from exhaust gas using a basic aqueous solution.

The basic aqueous solution used in the first embodiment is an alkanolamine aqueous solution (hereinafter referred to as an amine solution) mainly containing alkanolamine. Preferable examples of the amine solution include aqueous solutions containing, as a major component, a tertiary amine solution or an amine solution having a large steric hindrance. These amine aqueous solutions may be used singly, or in a combination of two or more. Examples of tertiary amine include 2-dimethylaminoethanol, N-methyldiethanolamine, and triethylenediamine. Further, the amine solution having a large steric hindrance is an amine solution in which a plurality of functional groups selected from alkyl group, hydroxy group, and amino group is bonded to one or more carbon atoms adjacent to the nitrogen atom; examples thereof include, but are not limited to, 2-isopropyl aminoethanol (IPAE) and 2-tert-butyl aminoethanol (t-BAE). Further, the aqueous solution containing, as a major component, a tertiary amine solution or an amine solution having a large steric hindrance may have a hydroxy group (—OH group) or an ether group (—O—), and may have a cyclic structure.

The reason for the preference of the aqueous solution containing a tertiary amine solution or an amine solution having a large steric hindrance as a major component is explained below. Generally, $CO_2$ in an amine solution is present mainly as a carbamate ion bonded to the nitrogen atom of the amine molecule, or a bicarbonate ion; however, $CO_2$ in a tertiary amine is mainly present as a bicarbonate ion, and $CO_2$ in an amine solution having a large steric hindrance is mainly present as a bicarbonate ion rather than as a carbamate ion. In contrast to the $CO_2$ desorption from a carbamate ion that requires relatively high energy, $CO_2$ desorption from a bicarbonate ion requires relatively low energy. Accordingly, an aqueous solution containing as a major component a tertiary amine solution or an amine solution having a large steric hindrance in which $CO_2$ is present mainly as a bicarbonate ion is considered preferable for the regeneration at a low temperature.

As shown in FIG. 1, the $CO_2$ recovery apparatus 1 mainly includes an absorption unit 2 and a regeneration unit 3. In the absorption unit 2, exhaust gas is introduced from a boiler. The exhaust gas contains $CO_2$, $N_2$, $H_2O$, and $O_2$. Further, in the absorption tower 21, the $CO_2$ is removed from the exhaust gas by being absorbed into an amine solution. The amine solution with the $CO_2$ absorbed therein (hereinafter referred to as a rich solution) is supplied to a regeneration unit 3 via lines L1 and L2. The line L1 has an absorption solution extraction pump 11 for supplying the rich solution by pressure.

The rich solution is heated in a heating container-type heat exchanger 31 in the regeneration unit 3 using a heating medium having a temperature of 100° C. or less. As a result, $CO_2$ containing vapor is desorbed from the rich solution. Although water is used as the heating medium in the present embodiment, vapor or a mixture of water and vapor may also be used as the heating medium. An oil medium such as silicone oil may also be used.

Further, the vapor-containing $CO_2$ is cooled in a cooling device 51, thereby condensing water from the vapor-containing $CO_2$ and recovering $CO_2$ in a $CO_2$ separator 52.

Furthermore, the amine solution from which the vapor-containing $CO_2$ is desorbed (an amine solution resulting from desorption of the vapor-containing $CO_2$ from the rich solution: hereinafter referred to as a lean solution) is supplied to a $CO_2$ absorption tower 21 in the absorption unit 2 via the lines L3 and L4 to be reused. The line L3 has a regeneration solution extraction pump 12 for supplying the lean solution by pressure. The line L4 has an amine solution cooler 24 for cooling the lean solution supplied to the absorption unit 2. The cooling of the lean solution is performed at about 40° C. in consideration of the temperature of the cooling water.

The absorption tower 21 is formed of a tower body that extends in the vertical direction.

The tower top H3 of the absorption tower 21 is connected to the line L4, thereby introducing the lean solution into the tower top H3. This lean solution is a solution resulting from desorption of the vapor-containing $CO_2$ in the regeneration unit 3, and has been cooled to about 40° C. in the amine solution cooler 24.

A filler 22 is provided in an intermediate unit H2 of the absorption tower 21. The exhaust gas introduced into a tower bottom H1 and the lean solution introduced into the tower top H3 react as they are brought into countercurrent contact with each other inside the filler 22. This reaction causes the $CO_2$ to be absorbed into the amine solution, thereby removing the $CO_2$ from the exhaust gas.

The tower top H3 has an exhaust gas outlet 23. The exhaust gas from which the $CO_2$ is removed is released to the outside through the exhaust gas outlet 23.

The tower bottom H1 is connected to the line L1, thereby supplying the rich solution with the $CO_2$ absorbed therein to a heating container-type heat exchanger 31 in the regeneration unit 3.

In addition to the heating container-type regenerator 31, the regeneration unit 3 also has the cooling device 51 and the $CO_2$ separator 52. The heating container-type regenerator 31 is connected to a rich/lean heat exchanger 41 via lines L2 and L3. The heating container-type regenerator 31 is connected to the $CO_2$ separator 52 via a line 5.

The rich solution after the $CO_2$ absorption in the absorption tower 21 is supplied to a rich/lean heat exchanger 41 via a line L1. Further, the lean solution after the desorption of the vapor-containing $CO_2$ in the heating container-type regenerator 31 is supplied to the rich/lean heat exchanger 41 via the line L3.

The rich/lean heat exchanger 41 performs heat exchange between the rich solution and the lean solution. With the heat exchange, the rich solution is heated and the lean solution is cooled.

After the heat exchange in the rich/lean heat exchanger 41, the rich solution is supplied to the heating container-type regenerator 31 via the line L2. The heating container-type regenerator 31 heats the rich solution using water at a temperature of 100° C. or less. As a result of the heating, the vapor-containing $CO_2$ is desorbed from the rich solution.

The vapor-containing $CO_2$ is supplied to the cooling device 51 and the $CO_2$ separator 52 via the line L5 so as to separate $CO_2$ from the vapor-containing $CO_2$ to recover $CO_2$. The $CO_2$ separation is a process of cooling the vapor-containing $CO_2$ supplied from the heating container-type regenerator 31 by the cooling device 51, thereby removing moisture from the vapor. The moisture removed from the vapor is stored in the $CO_2$ separator 52.

Further, the lean solution from which the vapor-containing $CO_2$ is desorbed is supplied from the heating container-type regenerator 31 to the rich/lean heat exchanger 41 via the line L3, and is subjected to heat exchange with the rich solution. After the heat exchange, the lean solution is cooled by the amine solution cooler 24 via the line L4, and is supplied to the absorption tower 21 to absorb $CO_2$.

Figure 2:
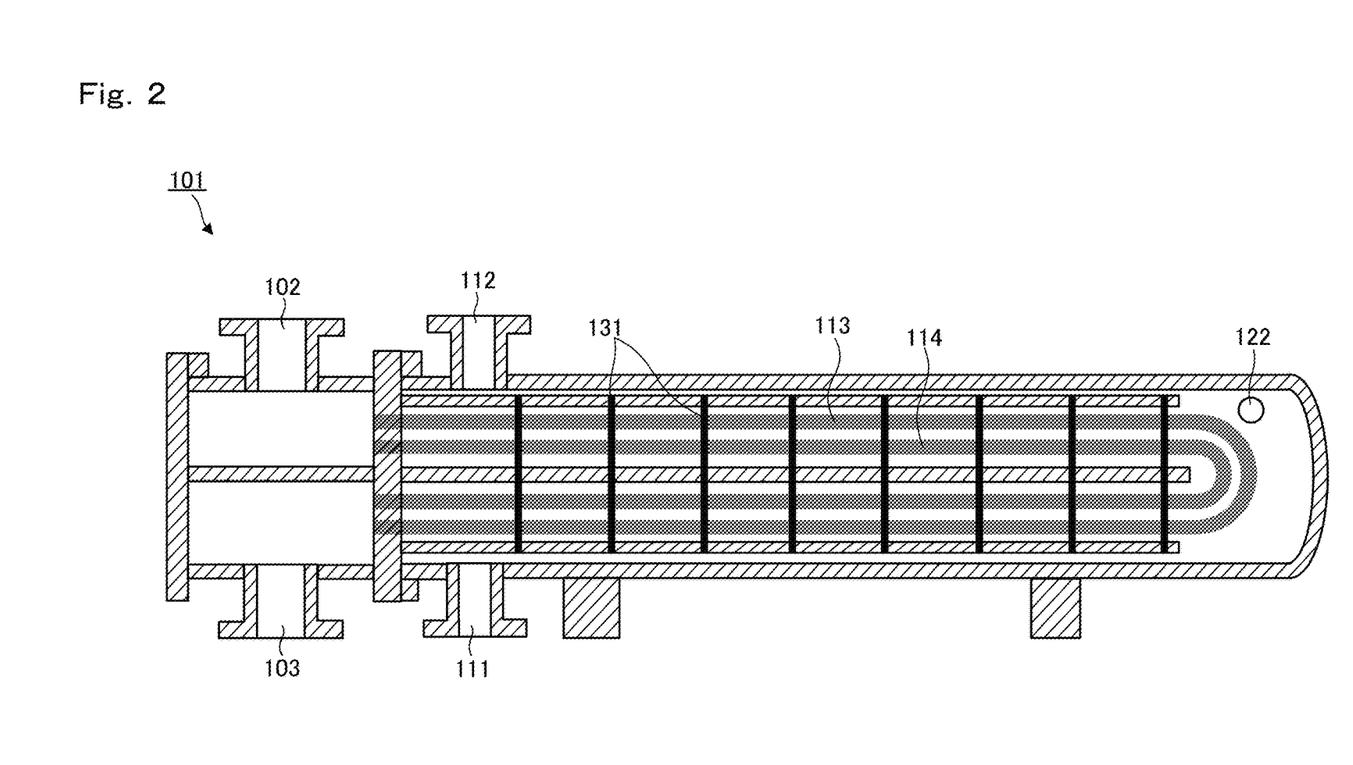
FIG. 2 is a cross-sectional view showing a heat exchanger that can be used as the regenerator shown in FIG. 1.

FIG. 2 shows a multitubular heat exchanger 101 having a known shell-and-tube structure that can be used as the heating container-type regenerator 31. However, heat exchangers having a structure other than the shell-and-tube structure may also be used as the heating container-type regenerator 31. The multitubular heat exchanger 101 is explained below.

The multitubular heat exchanger 101 includes a heating medium inlet 102 and a heating medium outlet 103 that are formed on one of the ends of the longitudinal direction. The water heated to a temperature of not more than 100° C. is introduced from the heating medium inlet 102.

U-shaped heat transfer pipes 113 and 114 are provided in the multitubular heat exchanger 101 shown in FIG. 2. One end (first end) of each of the heat transfer pipes 113 and 114 communicates with the heating medium inlet 102, while the other end (second end) communicates with the heating medium outlet 103. The water introduced from the heating medium inlet 102 passes through the heat transfer pipes 113 and 114 toward the second end, and then makes a U-turn toward the first end.

An amine solution inlet 111 and a vapor-containing $CO_2$ outlet 112 are formed on a lateral edge of the multitubular heat exchanger 101. Further, the shell-and-tube structure of the multitubular heat exchanger 101 has a hole in the body center in which an amine solution outlet hole 122 is provided. The amine solution inlet 111 and the amine solution outlet hole 122 are connected to the lines L2 and L3, respectively, and the rich solution is introduced from the amine solution inlet 111 into the multitubular heat exchanger 101.

The rich solution introduced from the amine solution inlet 111 flows in the space around the heat transfer pipes 113 and 114. A baffle board 131 is provided in the space around the heat transfer pipes 113 and 114. The baffle board 131 causes the rich solution to flow in a zigzag pattern. During the flow, the rich solution comes in contact with the outer surfaces of the heat transfer pipes 113 and 114, thereby subjecting the rich solution to heat exchange with the water in the heat transfer pipes 113 and 114. As a result, the rich solution is heated, and $CO_2$ is desorbed from the rich solution. Further, a catalyst (not shown) is disposed in the space where the rich solution flows (the space around the heat transfer pipes 113 and 114) so as to facilitate the $CO_2$ elimination reaction.

The lean solution from which the $CO_2$ is desorbed is discharged from the amine solution outlet hole 122, and is supplied to the rich/lean heat exchanger 41 (FIG. 1) via the line L3. The multitubular heat exchanger 101 (FIG. 2) is structured to accumulate the amine solution to the height of the amine solution outlet hole 122, and the height of the amine solution outlet hole 122 is adjusted so that the amine solution comes in contact with the entire outer surfaces of the heat transfer pipes 113 and 114.

The water passing through the heat transfer pipes 113 and 114 is cooled as a result of heat exchange with the rich solution. The cooled water is discharged from the heating medium outlet 103.

Further, the vapor-containing $CO_2$ desorbed from the rich solution is discharged from the vapor-containing $CO_2$ outlet 112 via the line L5, and is supplied to the cooling device 51 and the $CO_2$ separator 52.

By using the above multitubular heat exchanger 101 as the heating container-type regenerator 31, it is possible to ensure that the rich solution comes in contact with a large area of the heat transfer pipes without increasing the size of the apparatus. Therefore, the heat exchange between the rich solution and water can be facilitated, thereby desorbing a large amount of vapor-containing $CO_2$ from the rich solution.

A $CO_2$ recovery method using the $CO_2$ recovery apparatus 1 is described below.

The exhaust gas from the boiler is introduced into the tower bottom H1 of the absorption tower 21.

The amine solution passed through the line L4 is introduced into the tower top H3 of the absorption tower 21. This amine solution is an amine solution resulting from the desorption of the vapor-containing $CO_2$ in the heating container-type regenerator 31, and cooled to about 40° C. by passing through the rich/lean heat exchanger 41 and the amine solution cooler 24.

The amine solution introduced into the tower top H3 comes in countercurrent contact with the exhaust gas introduced into the tower bottom H1 in the filler 22. As a result, by the chemical reaction, the $CO_2$ in the exhaust gas is absorbed into the amine solution and thus is removed from the gas.

The exhaust gas from which the $CO_2$ is removed rises to the tower top H3, and is released to the outside through the exhaust gas outlet 23.

The amine solution with the $CO_2$ absorbed therein falls to the tower bottom H1. The amine solution that has thus fallen to the tower bottom H1 is increased in pressure by the pump 11, and is supplied to the rich/lean heat exchanger 41.

The rich/lean heat exchanger 41 performs heat exchange between the amine solution into which the $CO_2$ is absorbed in the absorption tower 21 and the amine solution from which the vapor-containing $CO_2$ is desorbed in the heating container-type regenerator 31.

The heating container-type regenerator 31 heats the amine solution with the $CO_2$ absorbed therein that has passed through the rich/lean heat exchanger 41 using a heating medium having a temperature of 100° C. or less. As a result, the amine solution is heated, and the $CO_2$ is desorbed from the amine solution.

The vapor-containing $CO_2$ is supplied to the $CO_2$ cooling device 51 to be cooled. As a result, the moisture contained in the $CO_2$-containing vapor is condensed, and the vapor-containing $CO_2$ is divided into high-purity $CO_2$ and moisture. The moisture is accumulated in the bottom of the $CO_2$ separator 52. The $CO_2$ is released to the outside of the $CO_2$ separator 52 and is recovered.

The amine solution from which the vapor-containing $CO_2$ is desorbed is supplied to the absorption tower 21 to absorb $CO_2$, and then is supplied to the rich/lean heat exchanger 41.

Figure 3:
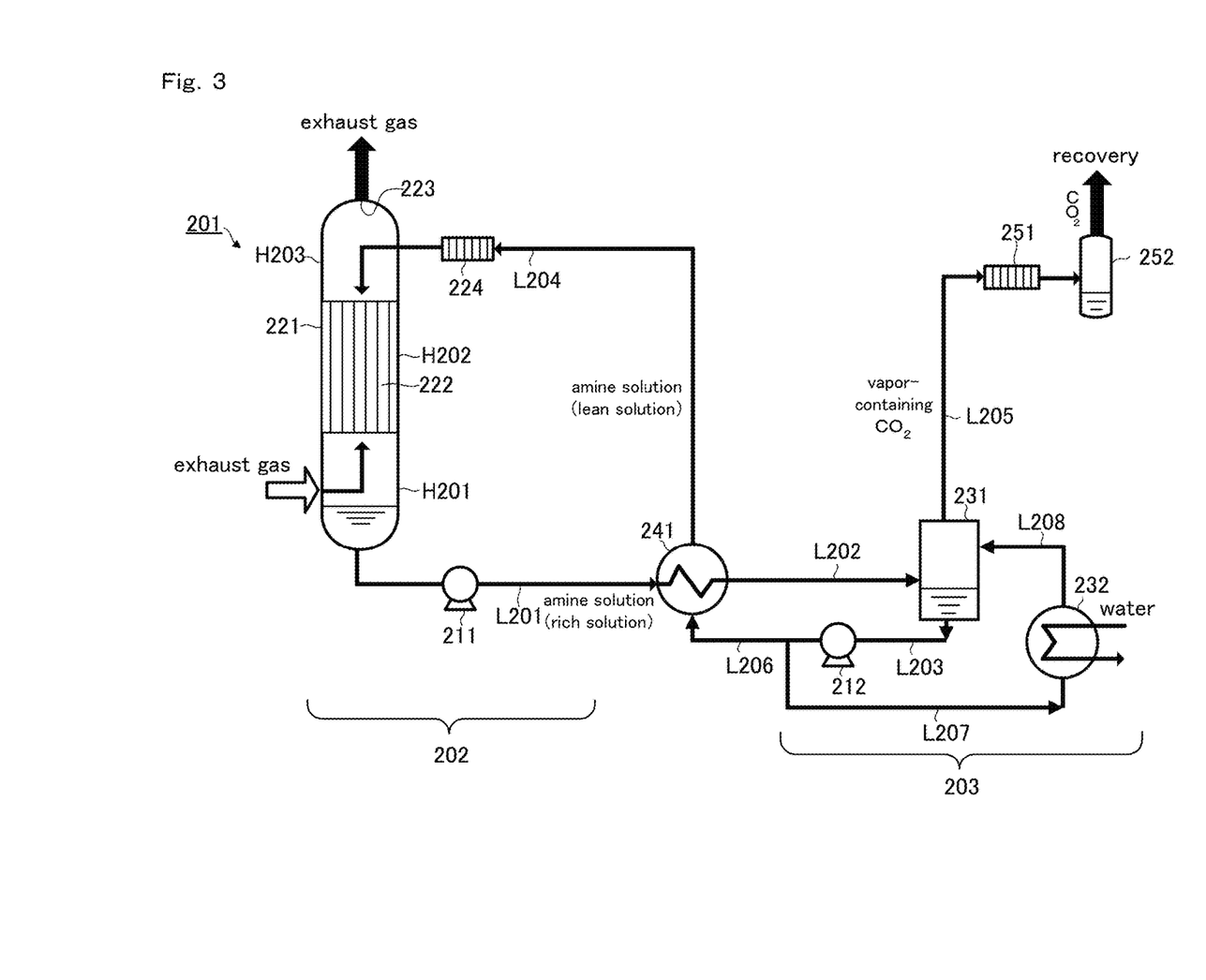
FIG. 3 is a diagram 2 schematically showing one embodiment of a $CO_2$ desorption apparatus according to the second embodiment of the present invention.

The $CO_2$ recovery apparatus and the $CO_2$ recovery method according to the second embodiment of the present invention are described below. FIG. 3 is a schematic diagram showing a $CO_2$ recovery apparatus 201 according to the second embodiment of the present invention. An absorption unit 202 of the $CO_2$ recovery apparatus 201 has the same structure as that of the absorption unit 2 of the $CO_2$ recovery apparatus 1 shown in FIG. 1. A rich/lean heat exchanger 241, a cooling device 251, and a $CO_2$ separator 252 of the $CO_2$ recovery apparatus 201 have the same structures as those of the rich/lean heat exchanger 41, the cooling device 51, and the $CO_2$ separator 52 of the $CO_2$ recovery apparatus 1, respectively.

The structure of the regeneration unit 203 of the $CO_2$ recovery apparatus 201 is different from the structure of the regeneration unit 3 of the $CO_2$ recovery apparatus 1. The regeneration unit 203 includes a non-heating container-type regenerator 231 for storing the amine solution, a heat exchanger 232 for heating the amine solution with a heating medium having a temperature of 100° C. or less, and a system for circulating the amine solution between the regenerator 231 and the heat exchanger 232.

The non-heating container-type regenerator 231 in the regeneration unit 203 is a container for storing the amine solution, and the vapor-containing $CO_2$ desorbed from the amine solution stored in the container is supplied to the cooling device 251 via a line L205. The non-heating container-type regenerator 231 is connected to a rich/lean heat exchanger 241 via lines L203 and L206, and is also connected to the amine-solution-heating heat exchanger 232 via lines L203 and L207. A non-heating container-type regenerator regeneration solution extraction pump 212 is provided in the line L203, and a portion of the amine solution in the non-heating container-type regenerator 231 is supplied by pressure to the rich/lean heat exchanger 241 via the lines L203 and L206 by the action of the non-heating container-type regenerator regeneration solution extraction pump 212, and another portion of the amine solution in the non-heating container-type regenerator 231 is supplied by pressure to the amine-solution-heating heat exchanger 232 via the lines L203 and L207. The amine-solution-heating heat exchanger 232 is a heat exchanger for heating the amine solution supplied from the regenerator 231 using a heating medium having a temperature of 100° C. or less. Further, the regeneration unit 203 has a line L208 for sending the amine solution heated by the amine-solution-heating heat exchanger 232 back to the non-heating container-type regenerator 231. Although the present embodiment uses water as the heating medium, vapor or a mixture of water and vapor may also be used as the heating medium. An oil medium such as silicone oil may also be used.

The structure of the non-heating container-type regenerator 231 is not particularly limited insofar as it can store a certain amount of the amine solution.

A $CO_2$ recovery method using the $CO_2$ recovery apparatus 201 is described below.

The absorption method performed in the absorption tower 221 is the same as the absorption method using the absorption tower 21 in the $CO_2$ recovery apparatus 1. The method of the heat exchange between the rich solution and the lean solution using the rich/lean heat exchanger 241 is the same as the heat exchange method using the rich/lean heat exchanger 41 in the $CO_2$ recovery apparatus 1. Further, the method of cooling the vapor-containing $CO_2$ passing through the line L205 using the cooling device 251, and separating water from the $CO_2$ by the subsequent $CO_2$ separator 252 is the same as the method of cooling the vapor-containing $CO_2$ using the cooling device 51, and separating water from the $CO_2$ by the subsequent $CO_2$ separator 52 in the $CO_2$ recovery apparatus 1.

The $CO_2$ is desorbed from the amine solution in the non-heating container-type regenerator 231 in the regeneration unit 203, and the desorbed vapor-containing $CO_2$ is cooled by the cooling device 251. A portion of the amine solution from which the $CO_2$ is desorbed in the non-heating container-type regenerator 231 and decreased in temperature as a result of the desorption is supplied by pressure to the rich/lean heat exchanger 241 via the lines L203 and L206 by the action of the non-heating container-type regenerator regeneration solution extraction pump 212, and another portion of the amine solution is supplied by pressure to the amine-solution-heating heat exchanger 232 via the lines L203 and L207. The amine solution is supplied to the amine-solution-heating heat exchanger 232 where heat is added to the amine solution by heating using a heating medium having a temperature of 100° C. or less. The heated amine solution is supplied again to the non-heating container-type regenerator 231 so as to retain the temperature of the amine solution in the non-heating container-type regenerator 231, thereby enabling vapor-containing $CO_2$ to be desorbed from the amine solution.

In the first and second embodiments described above, the heat supply to the amine solution in the process of desorbing the vapor-containing $CO_2$ from the amine solution in the regenerators 31 and 231 is performed using a heating medium having a temperature of 100° C. or less. The low-quality heat (low energy), such as a heat source of 100° C. or less, may be obtained from unused exhaust heat energy from thermal power stations, steel works, and other industries. Therefore, the above-described first and second embodiments enable $CO_2$ recovery using a low-quality heat.

Further, in the first and second embodiments, the vapor-containing $CO_2$ is desorbed from the amine solution by the heat exchange between the amine solution with the $CO_2$ absorbed therein and a heating medium. Additionally, by cooling the vapor-containing $CO_2$, moisture is removed from the vapor, thereby recovering the $CO_2$. Furthermore, according to the present embodiment, the amount of energies (1) and (2) below required during the $CO_2$ recovery may be reduced.

(1) Amount of exhaust heat upon cooling of amine solution
(2) Amount of exhaust heat upon cooling of vapor-containing $CO_2$ More specifically, reduction in the amount of exhaust heat (1) is accomplished such that, by using water at a temperature of 100° C. or less as the heating medium, the amine solution from which the vapor-containing $CO_2$ is desorbed has a temperature lower than that in the method using high-temperature steam. Further, this low-temperature amine solution is cooled and subjected to heat exchange with a heating medium (water). Therefore, it is possible to reduce the amount of exhaust heat required in the cooling step that is performed before the amine solution from which the vapor-containing $CO_2$ is desorbed is introduced into the absorption tower.

The reduction in the amount of exhaust heat (2) is accomplished such that, by using water at a temperature of 100° C. or less as the heating medium, the vapor-containing $CO_2$ desorbed from the amine solution has a temperature lower than that in the method using high-temperature steam. Therefore, it is unnecessary to greatly reduce the temperature of the vapor-containing $CO_2$ so as to separate $CO_2$ from the vapor-containing $CO_2$. As such, it is possible to reduce the amount of exhaust heat required in the cooling of the vapor-containing $CO_2$.

Accordingly, the first and second embodiments enable a reduction in the amount of exhaust heat during the $CO_2$ recovery, thereby reducing the thermal energy required for the $CO_2$ recovery.

Further, in the first and second embodiments, low-temperature water at 100° C. or less is used as the heating medium for the heat exchange with the amine solution. Therefore, efficient use of low-temperature water with a low energy (i.e., low-temperature water as a low-quality energy that is difficult to convert into mechanical work, and thus has low utility value) can be accomplished.

Further, the heat exchange between the amine solution and the heating medium may be performed in a state where a catalyst is provided in the flow path of the amine solution. With the use of the catalyst, it is possible to facilitate the elimination reaction of the vapor-containing $CO_2$, thereby recovering a large amount of $CO_2$. The catalyst may be provided either or both of the amine-storing portion inside the heating container-type regenerator 31 or the non-heating container-type regenerator 231, and the amine solution flow path (in the duct) in the regeneration unit 3 or 203. In both cases, the catalyst may be provided in a plurality of portions. The catalyst is described below in detail.

The catalyst is made of an inorganic powder or inorganic powder compact having a BET specific surface area of 7 $m^2/g$ or more. Since the inorganic powder or inorganic powder compact has a BET specific surface area of 7 $m^2/g$ or more, the $CO_2$ desorption catalyst has an excellent activity to desorb vapor-containing $CO_2$ from an amine solution. A BET specific surface area is a value obtained by dividing the surface area of an inorganic powder, including the contribution of unevenness, pores, etc., on the microscopic surface, by the mass of the inorganic powder. The BET surface area can be calculated as follows. A molecule whose adsorption area has been calculated is made to adsorb onto the surface of an inorganic powder at a liquid nitrogen temperature; based on the adsorbed amount, the BET surface area is calculated. The upper limit of the BET specific surface area is preferably 300 $m^2/g$ or less.

The specific surface area of the inorganic powder or inorganic powder compact can be obtained by measuring the specific surface area of the inorganic powder. When the inorganic powder has a specific surface area of 7 $m^2/g$ or more, the inorganic powder compact also has a BET specific surface area of 7 $m^2/g$ or more.

The BET specific surface area of the inorganic powder can be measured using a commercially available measuring instrument. Examples include the NOVA-4200e, produced by Quantachrome, and the like.

The components of the catalyst (inorganic powder or inorganic powder compact) are not limited as long as they are inorganic components. For example, any inorganic components can be used, such as boron nitride (BN), metal oxides, metal nitrides, metal carbides, metal borides, metals (simple substances), intermetallic compounds, clay minerals, and the like. Further, a composite oxide may be used as an oxide. The catalyst may be made of a single kind, or a combination of two or more kinds, of inorganic powder or inorganic powder compact.

Examples of metal oxides include $Al_2O_3$, $SiO_2$, $TiO_2$, $Cr_2O_3$, MgO, $Ga_2O_3$, CuO, ZnO, and the like. Examples of composite metal oxides include $Al_2O_3$—$Ga_2O_3$, CuO— ZnO, $Al_2O_3$—$SiO_2$, and $SiO_2$—$TiO_2$; and Sr- and Mg-doped lanthanum gallate (LSGM), Co-doped LSGM (LSGMC), and the like.

Examples of metal nitrides include MN, SiN, TiN, and the like.

Examples of metal carbides include SiC, TiC, $MgC_2$, and the like.

Examples of metal borides include $Co_2B$, $Fe_2B$, $Ni_2B$, PtB, $RuB_2$, and the like.

Examples of metals (simple substances) include Pd, Fe, Co, Ni, Cu, Ru, Ag, Au, Pt, Cr, and the like.

Examples of intermetallic compounds include AlFe, $CoPt_3$, CoFe, RuTi, and the like.

Examples of clay minerals include zeolites, talcs, sepiolites, kaolinites, montmorillonites, and the like.

Among these components of the catalyst, at least one member selected from the group consisting of BN, $Ga_2O_3$, $Al_2O_3$, Pd, Fe, and zeolites is preferable.

An inorganic powder or inorganic powder compact in which metal is supported on a component mentioned above may be used as the catalyst. The same metals given above as examples of metals (Pd, Fe, Co, Ni, Cu, Ru, Ag, Au, Pt, Cr, and the like) may be used as the metal supported on the component. For example, when $Al_2O_3$ is used as the catalyst, at least one member selected from the group consisting of Pd, Fe, Co, Ag, and Ni (in particular, at least one member selected from the group consisting of Pd, Fe, and Ag) is supported on the $Al_2O_3$. In this manner, the vapor-containing $CO_2$ desorbing activity can be improved.

When metal is supported, the loading of the supported metal is preferably 0.1 to 10 wt %, based on the entire catalyst.

The metal supported on the catalyst is in many cases in the so-called oxidation state immediately after the preparation. In this case, a reduction treatment may be performed in advance so that the metal in the oxidation state is reduced to the metal state. The catalytic activity of the catalyst is thereby further enhanced.

The reduction treatment may be performed, for example, by heat treatment in gas such as $H_2$ or $H_2$—$N_2$. The heat treatment is performed at a temperature of preferably 200 to 400° C. The duration of the heat treatment is preferably about 30 minutes to 5 hours.

The shape of the inorganic powder is not particularly limited. Examples include a spherical shape, a granular shape, an unfixed shape, a branched shape, a needle shape, a rod shape, a flat shape, and the like.

The size of the inorganic powder is not particularly limited. When the inorganic powder is spherical, the diameter is preferably about 0.01 to 10 μm.

A compact obtained by molding inorganic powder (an inorganic powder compact) can also be used as the catalyst. The shape of this compact is not particularly limited. Examples include a spherical shape, a columnar shape, a disk shape, a ring shape, a coating film shape, and the like.

The size of the inorganic powder compact is not particularly limited. When the compact has a disk-shape, the diameter is preferably about 1 to 100 mm.

The method for producing the inorganic powder compact is not particularly limited. For example, an inorganic powder that can be used in embodiments of the invention is molded by a tableting machine, an extruder, or the like.

When the inorganic powder compact is in the form of a coating film, the film thickness is preferably about 0.1 to 0.5 mm.

The inorganic powder compact in the form of a coating film (a coating film-like compact) may be produced, for example, in the following manner: organic substances, such as polyethylene glycol and/or ethyl cellulose, are mixed with an inorganic powder to produce a paste composition; next, the produced paste composition is applied to form a coating film, and then calcined to decompose and remove the organic substances. The calcination temperature is preferably 200° C. or higher.

A test for confirming the $CO_2$ desorption activity of the catalyst of embodiments of the present invention is described below.

Example 1

As Example 1 of embodiments of the present invention, 660 mg of Zeolite (produced by Tosoh Corporation, product name: HSZ-640 HOD1A; BET specific surface area catalog value: 400 $m^2$/g; diameter: about 1.5 mm; length: about 6 mm; extruded shape) was prepared.

Example 2

As Example 2 of embodiments of the present invention, 660 mg of spherical $Al_2O_3$ (produced by Sumitomo Chemical Co., Ltd., product name: KHA-46; BET specific surface area catalog value: 150 $m^2$/g) was prepared. Specifically, six spherical $Al_2O_3$ articles (110 mg each) each having a diameter of about 5 mm were prepared.

Comparative Example

As a Comparative Example of Examples 1 and 2, conventionally used metal filler (660 mg) was prepared. Specifically, seven fillers in total were prepared: six metal fillers (100 mg each) obtained by wadding a stainless steel mesh with a width of 6 mm and a length of 30 mm into a ball having a diameter of 6 mm; and one metal filler (600 mg) obtained by wadding a stainless steel mesh with a width of 6 mm and a length of 18 mm into a ball having a diameter of 6 mm.

Test Example 1: Surface Area Measurement

The apparent surface area of each catalyst obtained in Examples 1 and 2 and the Comparative Example was calculated, and the BET specific surface area was measured. The apparent surface area was calculated based on the size and shape of each catalyst. The apparent surface area of the metal filler of the Comparative Example was calculated based on the diameter, length, and number of stainless steel wires used to form the mesh. The BET specific surface area was obtained using the NOVA-4200e produced by Quantachrome. Table 1 shows the measurement results.

Test Example 2: Calculation of Desorption Rate of $CO_2$ Present in Test Liquid and Desorption Rate of $CO_2$ Per Apparent Surface Area An aqueous amine solution containing absorbed $CO_2$ (151.6 g-$CO_2$/L) was placed into a flask, to which one of each of the catalysts obtained in Examples 1 and 2 and the Comparative Example was added. The absorption solution was heated to 75° C. The heating was performed by immersing the flask in a silicone oil bath heated to 90° C. The flow rate of desorbed $CO_2$ when the absorption solution had a temperature of 75° C. was measured using a mass flow meter (Azbil Corporation, MQV0002). Table 1 shows the test results.

Consideration:

The $CO_2$ desorption rates obtained by using the catalysts of Examples 1 and 2 were higher than the $CO_2$ desorption rates obtained by using the metal filler of the Comparative Example. This indicates that the $CO_2$ desorption activity of each catalyst of Examples 1 and 2 is more excellent than that of metal filler.

TABLE 1

|  | Weight and surface area of test catalyst | | | $CO_2$ desorption rate when absorption solution is at 75° C. | |
| --- | --- | --- | --- | --- | --- |
|  | Weight (mg) | Apparent surface area ($cm^2$) | BET specific surface area ($m^2$/g) | $CO_2$ desorption rate (mL/min) | $CO_2$ desorption rate per apparent surface area (mL/(min/$cm^2$)) |
| Example 1 (Zeolite catalyst) | 660 | 21 | 400 | 180 | 9 |
| Example 2 (Alumina catalyst) | 660 | 4.7 | 150 | 221 | 47 |
| Comparative Example (Metal filler) | 660 | 22 | less than 3 | 88 | 4 |

DESCRIPTION OF REFERENCE NUMERALS

1: $CO_2$ recovery apparatus 1
2: Absorption unit
3: Regeneration unit
11: Absorption solution extraction pump
12: Heating container-type regenerator regeneration solution extraction pump
21: Absorption tower
22: Filler
23: Exhaust gas outlet
24: Amine solution cooling device
31: Heating container-type regenerator
41: Rich/lean heat exchanger
51: Cooling device
52: $CO_2$ separator
H1: Tower bottom
H2: Intermediate unit
H3: Tower top
L1, L2: Line for $CO_2$-absorbed amine solution
L3, L4: Line for $CO_2$-desorbed amine solution
L5: Line for vapor-containing $CO_2$
101: Multitubular heat exchanger-type regenerator
102: Heating medium inlet
103: Heating medium outlet
111: Amine solution inlet
112: Vapor-containing $CO_2$ outlet
113, 114: Heat transfer pipe
122: Amine solution outlet hole
131: Baffle board
201: $CO_2$ recovery apparatus 2
202: Absorption unit
203: Regeneration unit
211: Absorption solution extraction pump
212: Non-heating container-type regenerator regeneration solution extraction pump
221: Absorption tower
222: Filler
223: Exhaust gas outlet

224: Amine solution cooling device
231: Non-heating container-type regenerator
232: Amine-solution-heating heat exchanger
241: Rich/lean heat exchanger
251: Cooling device
252: $CO_2$ separator
H201: Tower bottom
H202: Intermediate unit
H203: Tower top
L201, L202: Line for $CO_2$-absorbed amine solution
L203, L204, L206, L207, L208: Line for $CO_2$-desorbed amine solution
L205: Line for vapor-containing $CO_2$

The invention claimed is:

1. A $CO_2$ recovery apparatus, comprising:
an absorption unit for allowing a basic aqueous solution to absorb $CO_2$; and
a regeneration unit for heating a basic aqueous solution with $CO_2$ absorbed therein by a regenerator as a heat exchanger using a heating medium having a temperature of 100° C. or less, thereby desorbing vapor-containing $CO_2$,
wherein:
a catalyst comprising an inorganic powder or inorganic powder compact having a BET specific surface area of 7 m²/g or more is provided in a portion having the basic aqueous solution inside the regenerator; and
the catalyst comprising an inorganic powder or inorganic powder compact is a zeolite catalyst or alumina catalyst, or a combination of two or more kinds of these catalysts.

2. The $CO_2$ recovery apparatus according to claim 1, wherein, the regenerator has a multitubular heat exchanger structure.

3. A $CO_2$ recovery apparatus, comprising:
an absorption unit for allowing a basic aqueous solution to absorb $CO_2$; and
a regeneration unit for heating a basic aqueous solution with $CO_2$ absorbed therein using a heating medium having a temperature of 100° C. or less, thereby desorbing vapor-containing $CO_2$,
wherein:
the regeneration unit comprises a regenerator for storing a basic aqueous solution, an amine-solution-heating heat exchanger for heating a basic aqueous solution using a heating medium having a temperature of 100° C. or less, and a system for circulating a basic aqueous solution between the regenerator and the amine-solution-heating heat exchanger;
the system supplies a basic aqueous solution from which $CO_2$ is desorbed in the regenerator and which is decreased in temperature to the amine-solution-heating heat exchanger, and supplies a basic aqueous solution to which heat is added by heating in the amine-solution-heating heat exchanger using a heating medium having a temperature of 100° C. or less to the regenerator;
a catalyst comprising an inorganic powder or inorganic powder compact having a BET specific surface area of 7 m²/g or more is provided in a portion having the basic aqueous solution inside the regenerator; and
the catalyst comprising an inorganic powder or inorganic powder compact is a zeolite catalyst or alumina catalyst, or a combination of two or more kinds of these catalysts.

4. The $CO_2$ recovery apparatus according to claim 1, further comprising:
a rich/lean heat exchanger for performing heat exchange between the basic aqueous solution with $CO_2$ absorbed therein and a basic aqueous solution from which vapor-containing $CO_2$ is desorbed;
a cooler for cooling the basic aqueous solution from which vapor-containing $CO_2$ is desorbed to 50° C. or less after the basic aqueous solution passes through the rich/lean heat exchanger; and
a cooling device for cooling the vapor-containing $CO_2$, thereby removing moisture from the vapor-containing $CO_2$.

5. The $CO_2$ recovery apparatus according to claim 1, wherein the heating medium is water.

6. The $CO_2$ recovery apparatus according to claim 1, wherein the basic aqueous solution is an alkanolamine aqueous solution.

7. The $CO_2$ recovery apparatus according to claim 6, wherein the alkanolamine aqueous solution is an aqueous solution containing, as a major component, a single kind or a combination of two or more kinds of tertiary amine solutions and/or amine solutions having a large steric hindrance.

* * * * *